United States Patent [19]

Skoog et al.

[11] Patent Number: 4,710,092

[45] Date of Patent: Dec. 1, 1987

[54] INDUSTRIAL ROBOT HAVING TWO GIMBAL-RING TYPE ARRANGED SWINGING AXES

[75] Inventors: Hans Skoog; Ulf Holmqvist; Leif Tellden, all of Västerås, Sweden

[73] Assignee: ASEA AB, Västerås, Sweden

[21] Appl. No.: 732,650

[22] Filed: May 10, 1985

[30] Foreign Application Priority Data

May 18, 1984 [SE] Sweden ............................... 8402693

[51] Int. Cl.$^4$ ............................................. B25J 11/00
[52] U.S. Cl. ..................................... 414/729; 901/17; 901/25
[58] Field of Search ....................... 901/26, 27, 28, 29, 901/17, 18, 19, 23, 24, 25; 414/729

[56] References Cited

U.S. PATENT DOCUMENTS

| | | | |
|---|---|---|---|
| 3,212,649 | 10/1965 | Johnson et al. ................... | 901/17 X |
| 3,665,148 | 5/1972 | Yasenchak et al. . | |
| 3,948,093 | 4/1976 | Folchi et al. ..................... | 901/29 X |
| 4,311,556 | 1/1982 | Iwamoto et al. .................. | 901/17 x |
| 4,502,830 | 3/1985 | Inaba et al. ....................... | 901/29 X |

FOREIGN PATENT DOCUMENTS 53-52776  4/1978  Japan .
8403046-6  6/1984  Sweden .

OTHER PUBLICATIONS

International Search Report.

*Primary Examiner*—Robert J. Spar
*Assistant Examiner*—D. Glenn Dayoan
*Attorney, Agent, or Firm*—Watson, Cole, Grindle & Watson

[57] ABSTRACT

An industrial robot having a gimbal-ring type suspension incorporating two axes renders therewith a translatorily movable arm swingable. According to the invention, the translatory movement is achieved in that the gimbal-ring type suspension, which can be swung with the aid of two motors, carries a part in the form of a box-like structure in which a platform provided with a rack can be slidably moved on guides, the platform being driven to translatory motion by a pinion. The platform carries a fourth, a fifth and a sixth motor, of which the fourth motor is able to rotate the arm about its longitudinal axis while the fifth and sixth motor drive their respective drive shafts for swinging the tool holder and rotating the same.

3 Claims, 3 Drawing Figures

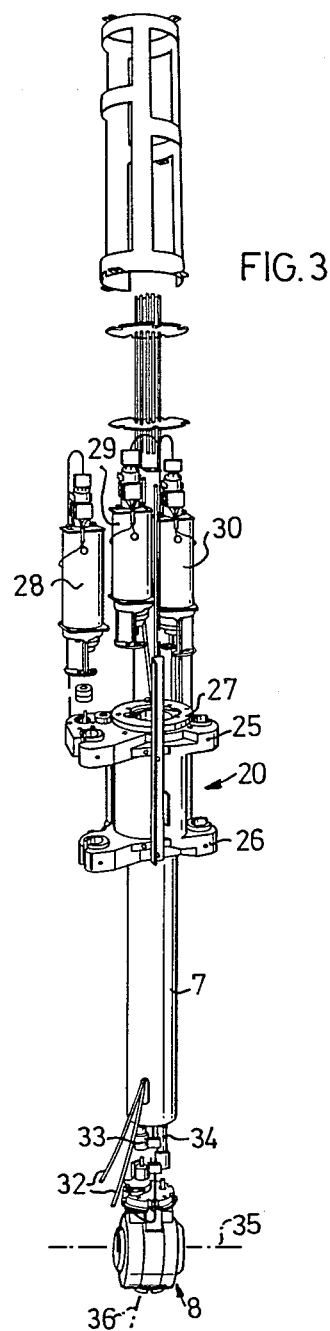

INDUSTRIAL ROBOT HAVING TWO GIMBAL-RING TYPE ARRANGED SWINGING AXES

Applications disclosing subject matter of interest to the subject matter of the subject application are U.S. Ser. No. 732,722 to Tellden, filed May 10, 1985, now U.S. Pat. No. 4,636,134, and U.S. Ser. No. 734,196 to Forslund, filed May 15, 1985, now U.S. Pat. No. 4,643,036, both assigned to the same assignee as the subject application.

The present invention relates to an industrial robot having a gimbal-ring type suspended part which can be swung about two mutually perpendicular axes by means of a first and a second motor, there being arranged in the gimbal-ring type suspended part an arm which is driven for translatory motion by a third motor and which has a rotatable or twistable tool attachment mounted on an outwardly projecting end thereof.

An industrial robot of this kind is known from Japanese Patent Application No. 53-52776. The translatorily movable arm of this known construction comprises a screw-threaded spindle which is locked against rotation and which can be moved axially with the aid of an axially immovable nut capable of being turned by a motor.

This construction, however, affords only three degrees of freedom in space, meaning that the tool attachment can be placed in any selected position in a working range. In order to cause, for example, a gripping tool to adopt an adjustable attitude there are, in principle, required three further degrees of freedom, which means that there must be mounted on the translatorily movable arm either three motors with associated movable members or at least the three members which move internally of one another that are required when the force shall be applied from motors positioned at some other location. Since the Japanese application is based substantially on the assumption that all motors shall be mounted firmly at the location carrying the "outermost" bearing of the gimbal-ring type or universal suspension, it is not seen how this further problem can be readily solved.

The solution afforded by the universal or gimbal-ring type suspension is of principle interest, however, with respect to the possibilities of achieving rapid motion. This applies particularly to constructions which incorporate articulated arms and the like, since the fact that the drive motors must be placed adjacent to or preferably in a stationary mounting part presents a further problem.

An object of the present invention is to provide a rapidly operating and accurate industrial robot constructed on the basis of the known gimbal-ring type suspension. In this respect the use of heavy motors and like devices shall not render the arrangement sluggish when mounted in the proximity of the principal pivot points of the system. The invention is thus based on the view that, contrary to the proposals set forth in the aforesaid Japanese application, it is unnecessary to mount all motors on the stationary mounting of the robot, but that the motors shall instead be mounted in the vicinity of points at which the principal pivot or swinging axes intersect, therewith obviating, in accordance with the invention, the requirement that they shall be immovable.

More specifically, these and other advantages together with further objects of the invention are achieved with an industrial robot of the kind mentioned in the introduction having the characteristic features set forth in the characterizing clause of claim 1. The gimbal-ring type suspended part suitably has the form of a box-like structure or a tube of preferably rectangular cross-section, in which guide means are arranged. The platform, which thus carries three motors with associated resolvers, is in fact movable in relation to the pivot centre of the cardanic suspension of the arrangement and the translational movement is characterized by its sluggish mass. The mobility and speed of remaining degrees of freedom, however, are not unduly influenced hereby and the industrial robot is distinguished by its high degree of mobility in operation and the high degree of operational control afforded.

The fifth and the sixth motor each drives its respective shaft and is located at a constant distance from the tool attachment, and hence power can be transferred readily via rotational journal pins or trunnions with a minimum of play. The wrist joint located at the tool attachment may have the construction disclosed, for example, in a Swedish Patent Application Ser. No. 8403043-6.

The invention will now be described with reference to an embodiment thereof illustrated in the drawings. In the drawings, FIG. 1 is a total view of an industrial robot.

FIG. 3 is an exploded view of the translatorily movable platform with its rotatable arm and tool attachment.

Figure 1:
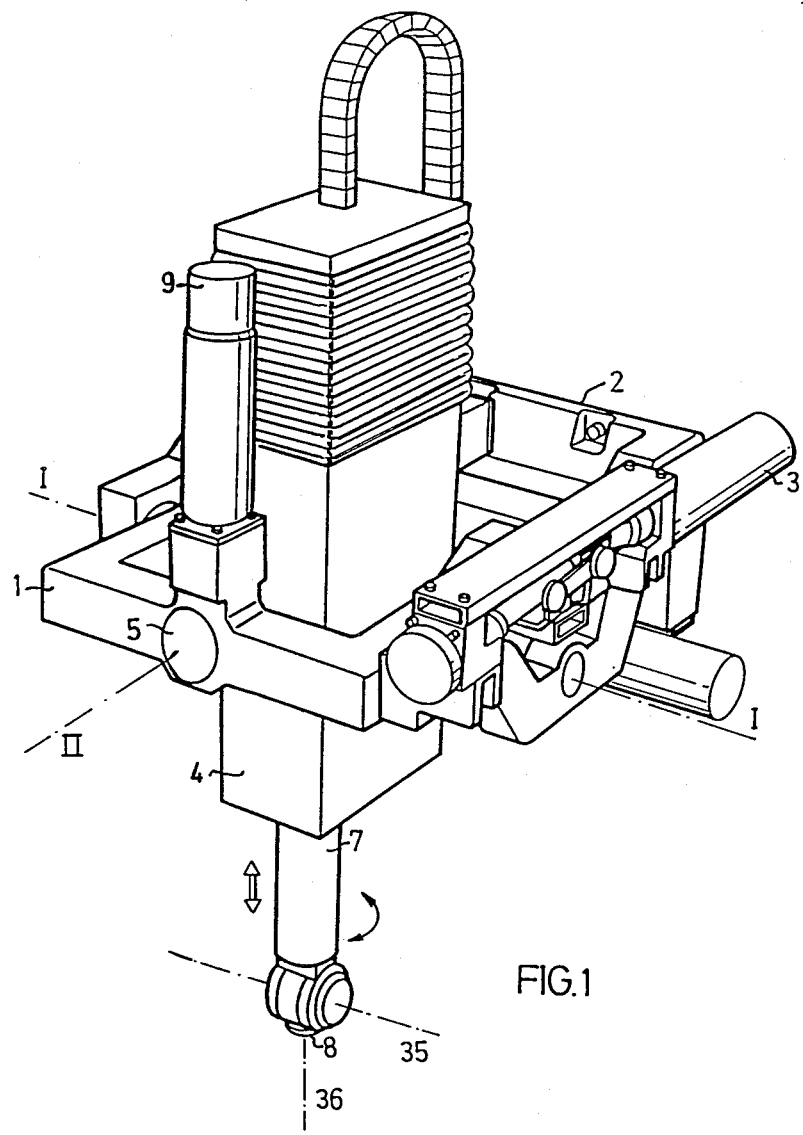

The schematic view of FIG. 1 illustrates a universal or gimbal-ring type suspension comprising a mounting 2 which can be attached to a wall, a ceiling or some other bearing structure, and in which a "ring" 1 is mounted on journals for rotation about a first pivot axis I. Pivotally mounted in the "ring" 1 on journals or trunnions 5 and 6 (of which only the journal means 5 is shown in this figure) for rotation about a swinging axis II is a box-like structure 4. The "ring" 1 is swung by a motor 3 and a lever system, merely outlined in the figure, which is activated by a spindle driven by the motor 3. Although not apparent from the figure, a similar swinging mechanism of this construction is able to swing the box-like structure about the axis II.

Extending from the box-like structure 4 is an arm 7 provided with a tool holder securing a tool 8. The arm 7 can be rotated about its longitudinal axis and extended out of and withdrawn into the box-like structure 4 as indicated by the arrows shown, in a manner hereinafter described.

Figure 2:
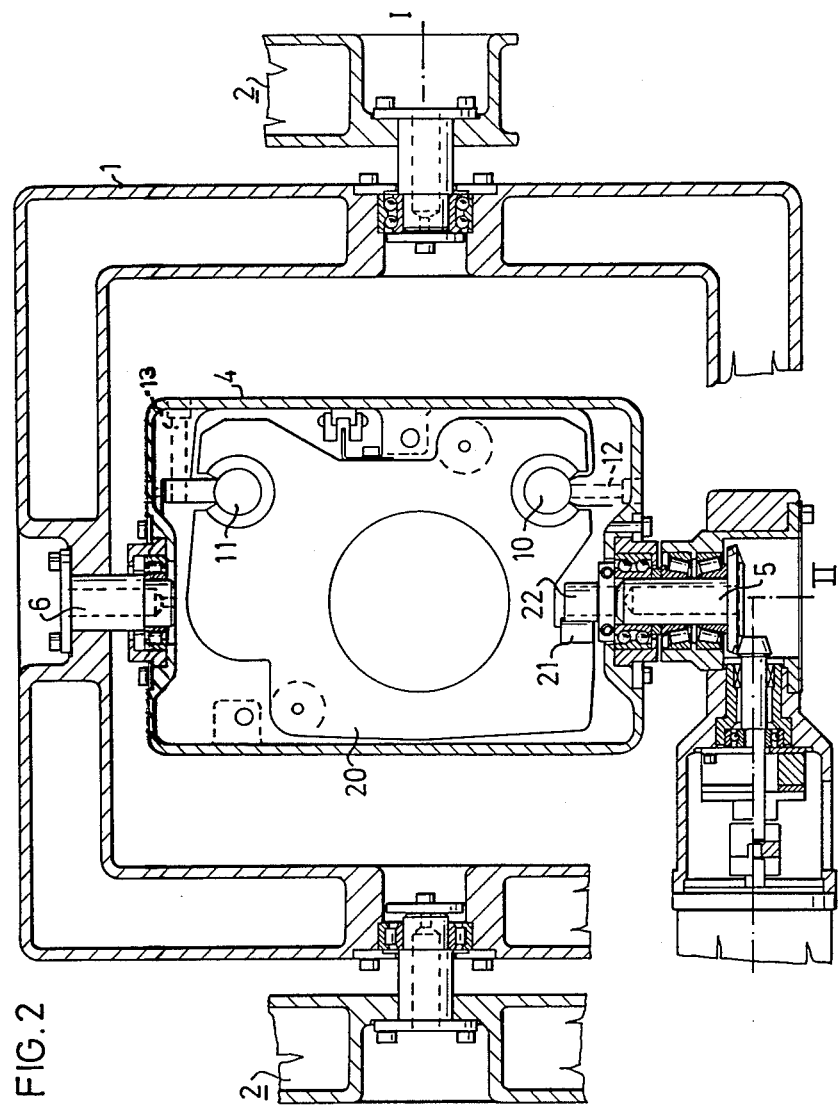
FIG. 2 is a sectional view of the robot illustrated in FIG. 1, with the section taken through the pivot axes of the gimbal-ring type suspension.

FIG. 2 is a sectional view taken through the axes I and II (with the gimbal-ring type suspension located centrally). The box-like structure 4, which is thus gimbal-ring type or universally suspended, has provided therein two mutually parallel guides 10 and 11, which extend almost the whole length of the box-like structure at right angles to the axes I and II and are attached to said structure from the inside thereof with the aid of adjustable attachment means 12 and 13. A platform 20 is slidably mounted on the guides for translational movement, driven by the motor 9 (FIG. 1) via the journal means 5 rotatably mounted in both the "ring" 1 and the box-like structure 4. The principle of transmission through the trunnion or journal pin has been made the subject of Swedish Patent Application Serial No. 84.02689-7 corresponding to U.S. patent application Ser. No. 732,722 filed May 10, 1985. Seated on the inner end of the journal means is a pinion 22 which meshes with a rack attached to the platform 20 and extending parallel to the guides 10 and 11.

The platform 20 arranged for movement in the box-like structure 4 can best be seen in FIG. 3. The two bearing carrying support plates 25 and 26 of the platform 20 are joined by a rigid structure. The arm 7 is extended through the platform and journalled for axial rotation therein in a manner not shown and is terminated at its upper end with the gear 27. The arm 7 is rotated by means of a motor 28 whose outward saft drives the gear 27 via an intermediate gear. The shaft to the intermediate gear is made adjustable, so that mating of the two gears can be adjusted to exclude any play. The two motors 29 and 30 are attached to the gear 27 and thus accompany the rotational movement of the gear, and therewith the arm 7, effected by the motor 28. The cables supplying the motors 28,29 and 30 together with other devices, such as compressed air hoses 32 serving the tool attachment and necessary to the action of the robot will consequently become tangled and twisted.

Each of the motors 29 and 30 drives its respective shaft 33 and 34 which in turn respectively effect a swinging or rotational motion about an axis 35 which extends at right angles to the axial direction of the shaft 7 and about an axis 36 which extends at right angles to the shaft 35, whereby the actual tool holder obtains two further degrees of movement. The industrial robot is therewith equipped with six degrees of freedom and thus theoretically has full freedom of motion within its definition range.

It will be noticed that all degrees of freedom, with the exception of one, are achieved by rotational or twisting motion about a horizontal or about a vertical axis, and in the main through points which lie close to the centre of gravity of the rotated part and with the major part of the movable mass close to the axis of rotation, so that inertia forces are low. Only one degree of freedom is associated with translatory motion those inertia may have significance. Consequently, the tool holder can be subjected to very high acceleration (in excess of 1 G) in respect of five of the degrees of freedom. The precision to which the movements are carried has also been found to be very high.

As an example in this respect, a test plant having the following data was constructed.

The working area had the form of a truncated cone having a height of 350 mm, half the cone angle 30°, and the wider base part being of circular shape with a radius of 500 mm. Within this approximate working area there was achieved a setting accuracy in respect of the tool attachment of 0.1 mm or better.

We claim:

1. An industrial robot comprising a gimbal-ring type suspended part, a first motor and a second motor for rotating the gimbal-ring type suspended part about two mutually perpendicular axes, a translatory movable arm having an axis and in the gimbal-ring type suspended part, a protruding end of the arm having an axially rotatable tool attachment, said arm being attached to a platform which is mounted on guides located within the gimbal-ring type suspended part, a third motor mounted on the gimbal-ring type suspended part, the third motor for providing translatory movement of the platform along the guides, and three additional motors mounted on said platform including a fourth motor whose shaft connects through a gear engagement with a gear which is rotatably mounted on the platform on the same axis as the arm, and a fifth motor and a sixth motor attached to said gear, the fifth and the sixth motors each connected to a respective shaft which extend to the tool attachment and which are adapted to rotate said tool attachment about a first tool axis extending at right angles to the arm and about a second tool axis which extends at right angles to the first tool axis.

2. An industrial robot according to claim 1, wherein the gimbal-ring type suspended part supporting the fourth, fifth and sixth motors comprises a box-like structure to which are attached the two guides, the platform slidably movable through the guides by means of a rack mounted on the platform and a pinion in meshing engagement with the rack, the pinion rotatably mounted on the box-like structure and coupled to the third motor.

3. An industrial robot according to claim 2, wherein the platform includes two carrier plates each having two guide bearings, the carrier plates connected to each other to form a rigid platform assembly, the third, fourth and fifth motors being mounted above one of the two said carrier plates.

* * * * *